United States Patent
White et al.

(10) Patent No.: US 9,844,818 B2
(45) Date of Patent: Dec. 19, 2017

(54) FLEXIBLE AND EXTENDIBLE DRILL BIT ASSEMBLY

(71) Applicants: Christopher L White, Morrison, CO (US); Richard M Davidian, Anderson, SC (US)

(72) Inventors: Christopher L White, Morrison, CO (US); Richard M Davidian, Anderson, SC (US)

(*) Notice: Subject to any disclaimer, the term of this patent is extended or adjusted under 35 U.S.C. 154(b) by 143 days.

(21) Appl. No.: 14/743,182

(22) Filed: Jun. 18, 2015

(65) Prior Publication Data

US 2015/0283621 A1 Oct. 8, 2015

Related U.S. Application Data

(63) Continuation of application No. 12/203,979, filed on Sep. 4, 2008, now Pat. No. 9,089,901, which is a continuation-in-part of application No. 11/382,560, filed on May 10, 2006, now Pat. No. 7,435,042.

(51) Int. Cl.
*B23B 31/107* (2006.01)
*B23B 45/00* (2006.01)
*B23B 51/12* (2006.01)

(52) U.S. Cl.
CPC ........ *B23B 45/005* (2013.01); *B23B 31/1071* (2013.01); *B23B 51/126* (2013.01); *B23B 2260/068* (2013.01); *B23B 2265/326* (2013.01); *B23B 2270/06* (2013.01); *Y10T 279/17752* (2015.01); *Y10T 279/17803* (2015.01); *Y10T 408/665* (2015.01); *Y10T 408/9097* (2015.01)

(58) Field of Classification Search
CPC . B23B 31/107; B23B 31/1071; B23B 45/005; Y10T 408/665; Y10T 279/17752; Y10T 279/17743
See application file for complete search history.

(56) References Cited

U.S. PATENT DOCUMENTS

| | | |
|---|---|---|
| 1,386,161 A | 8/1921 | Hugh |
| 2,008,894 A | 7/1935 | Bergstrom |
| 2,357,773 A | 9/1944 | Sheskier |
| 2,472,392 A | 6/1949 | Alexander |
| 2,487,203 A | 11/1949 | Wilber |
| 2,491,605 A | 12/1949 | Chittenden |

(Continued)

FOREIGN PATENT DOCUMENTS

JP 08090313 A 4/1996

*Primary Examiner* — Daniel Howell
(74) *Attorney, Agent, or Firm* — Trego, Hines & Ladenheim, PLLC; Brandon Trego; Jonathan Hines

(57) ABSTRACT

An extension assembly configured to permit a user to drill a hole through inaccessible areas in a wall is disclosed. The extension assembly includes a flexible, solid core rod having first and second ends and a holding means. The rod is configured to extend through a hole in a wall cavity and flex therein to position a tool bit at an inaccessible location in the wall cavity and permit a user to drill a hole through a substrate at the inaccessible location. The holding means is secured to the second end of the rod for releasably holding a tool bit for rotation with the rod and includes a sleeve adapted to slide axially along a body of the holding means between a secured position where a tool bit is securely held within the holding means and a release position where the tool bit is released from the holding means.

18 Claims, 14 Drawing Sheets

(56) References Cited

U.S. PATENT DOCUMENTS

| | | | |
|---|---|---|---|
| 2,496,412 | A | 2/1950 | Scheppe |
| 2,567,994 | A | 9/1951 | Downs |
| 2,747,384 | A | 5/1956 | Beam |
| 2,790,646 | A | 4/1957 | Emrick |
| 2,905,178 | A | 9/1959 | Hilzinger, III |
| 2,926,020 | A | 2/1960 | Dayton et al. |
| 2,958,349 | A | 11/1960 | McNutt |
| 2,977,807 | A | 4/1961 | Conover |
| 3,006,223 | A | 10/1961 | Broussard |
| 3,016,073 | A | 1/1962 | Broussard et al. |
| 3,251,605 | A | 5/1966 | Ondeck |
| 3,611,549 | A | 10/1971 | Pope |
| 3,735,993 | A | 5/1973 | Seibert |
| 4,692,073 | A | 9/1987 | Martindell |
| 4,828,277 | A | 5/1989 | De Bastiani et al. |
| 4,900,202 | A | 2/1990 | Wienhold |
| 4,990,038 | A | 2/1991 | Delong |
| 5,167,476 | A | 12/1992 | Lafferty et al. |
| 5,398,946 | A | 3/1995 | Quiring |
| 5,957,634 | A | 9/1999 | Carpinetti |
| 6,171,033 | B1 | 1/2001 | Wrobel |
| 6,199,872 | B1 | 3/2001 | Hasan |
| 6,270,087 | B1 | 8/2001 | Mickel et al. |
| 6,311,989 | B1 | 11/2001 | Rosanwo |
| 6,511,266 | B1 | 1/2003 | Groot |
| 6,511,268 | B1 | 1/2003 | Vasudeva et al. |
| 6,561,523 | B1 | 5/2003 | Wienhold |
| 7,435,042 | B2 | 10/2008 | White et al. |
| 8,770,898 | B2 * | 7/2014 | Nordlin ............... B23B 31/1071 408/127 |
| 9,089,901 | B2 * | 7/2015 | White ................. B23B 31/1071 |
| 2001/0042964 | A1 | 11/2001 | Bedi et al. |
| 2007/0206996 | A1 | 9/2007 | Bharadwaj et al. |

* cited by examiner

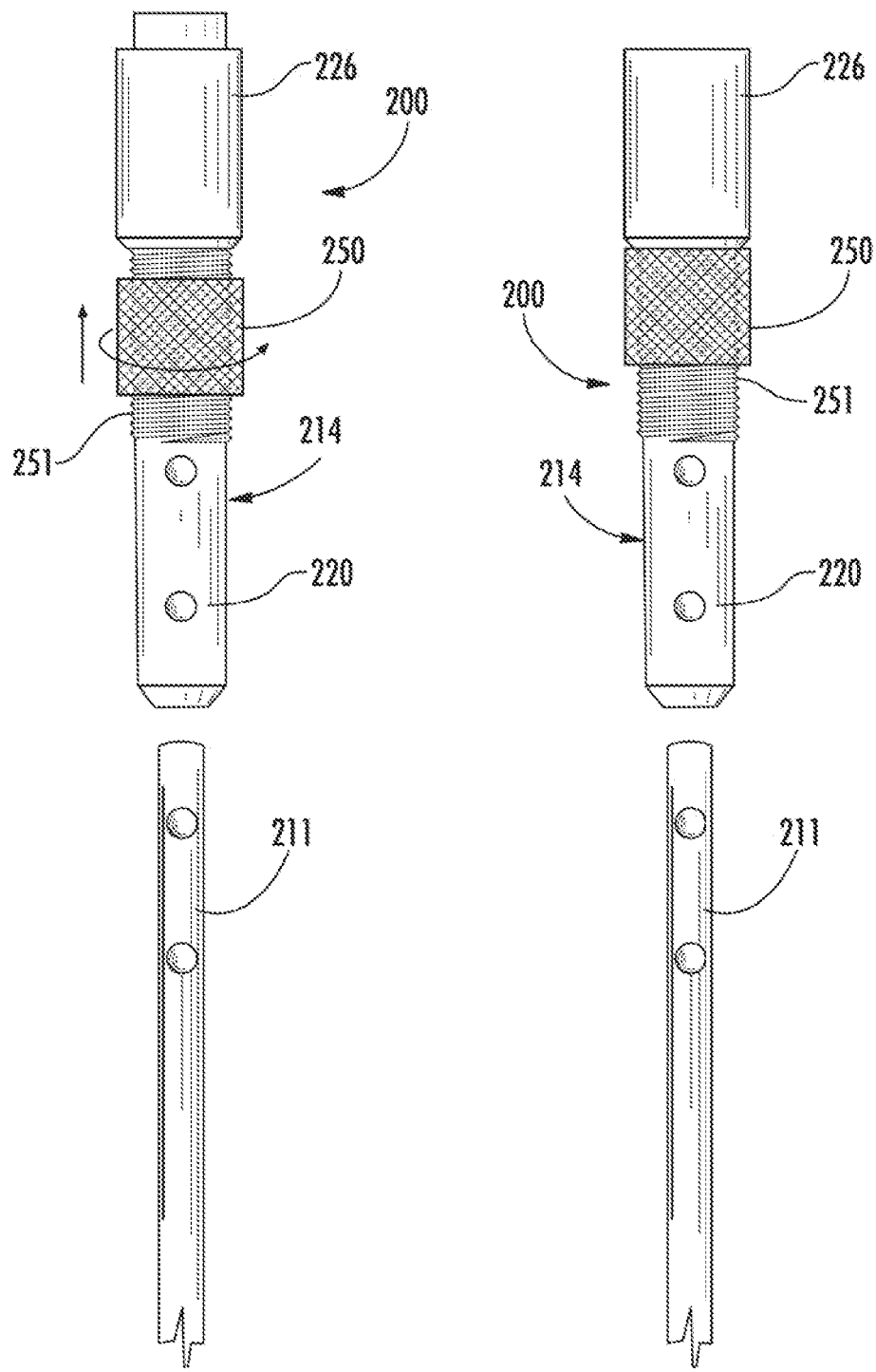

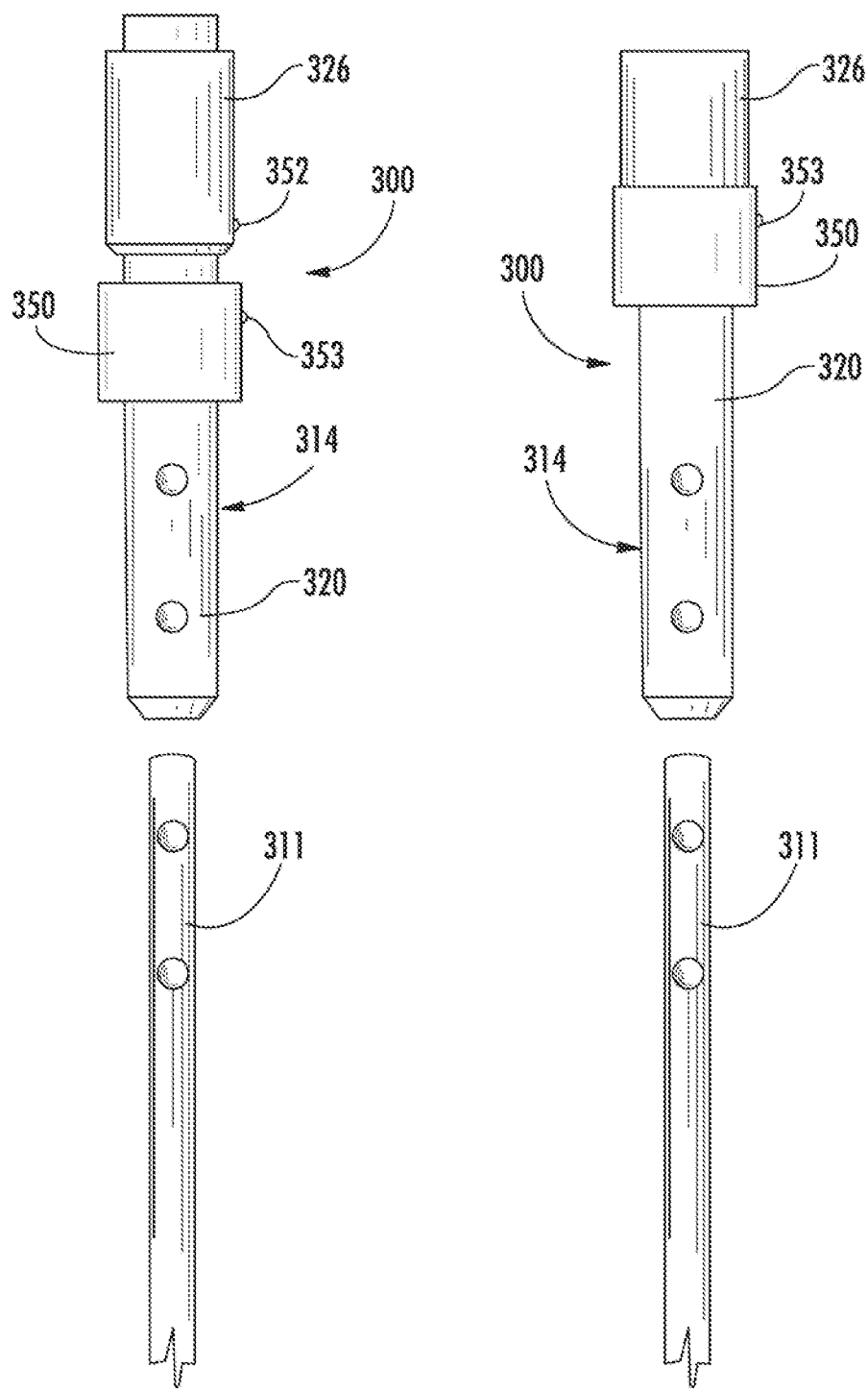

FLEXIBLE AND EXTENDIBLE DRILL BIT ASSEMBLY

BACKGROUND OF THE INVENTION

The present invention relates to the field of flexible drill bits used to create extended length holes and holes through inaccessible areas in walls and framing. More particularly, the invention relates to a flexible, extendable drill bit assembly that allows the use of a variety of drilling heads and accessories.

Flexible, extended drill bits are widely employed to create a system of holes within residential and commercial building construction for the purpose of running extended wiring and cabling throughout the building. The extended length drill bits presently available are of a unitary construction, requiring a user to purchase a drill bit having a specified diameter for each individually sized hole desired. The drill bits come in various lengths which require a user to purchase a separate drill bit for each specified length of a hole. Moreover, when the cutting edge is damaged, the entire drill bit must be replaced, incurring additional expense.

Accordingly, there is a need for a flexible, extendable drill bit assembly that allows the use of drill bits and other accessories of various sizes.

BRIEF SUMMARY OF THE INVENTION

This need is addressed by providing an extension assembly configured to permit a user to drill a hole through inaccessible areas in a wall. The extension assembly includes a flexible, solid core rod having first and second ends. The rod being configured to extend through a hole in a wall cavity and flex therein to position a tool bit at an inaccessible location in the wall cavity and permit a user to drill a hole through a substrate at the inaccessible location. The extension assembly further including a holding means secured to the second end of the rod for releasably holding a tool bit for rotation with the rod. The holding means including a sleeve adapted to slide axially along a body of the holding means between a secured position where a tool bit is securely held within the holding means and a release position where the tool bit is released from the holding means.

This need may also be addressed by providing a drill bit assembly configured to permit a user to drill a hole through inaccessible substrates in a wall includes a flexible, solid core rod having first and second ends; and a quick-release head secured to the second end of the rod for receiving and securing a drill bit therein. The head including a sleeve adapted to slide axially along a body of the head between a secured position where a drill bit is securely held within the head and a release position where the drill bit is released from the head.

BRIEF DESCRIPTION OF THE DRAWINGS

The subject matter that is regarded as the invention may be best understood by reference to the following description taken in conjunction with the accompanying drawing figures in which:

FIG. 11 shows a drill bit assembly;

FIG. 12 shows the drill bit assembly of FIG. 11 in a secured position;

FIG. 14 is a drill bit assembly;

FIG. 15 shows the drill bit assembly of FIG. 14 in a secured position;

DETAILED DESCRIPTION OF THE INVENTION

Figure 1:
FIG. 1 shows a user drilling an extended length hole through a wall.

Referring now specifically to the drawings, a flexible, extendable drill bit assembly is illustrated in FIG. 1 and shown generally at reference numeral 10. As shown, the drill bit assembly 10 allows a user to drill a hole through a wall to allow the user to run wiring and cabling.

Figure 2:
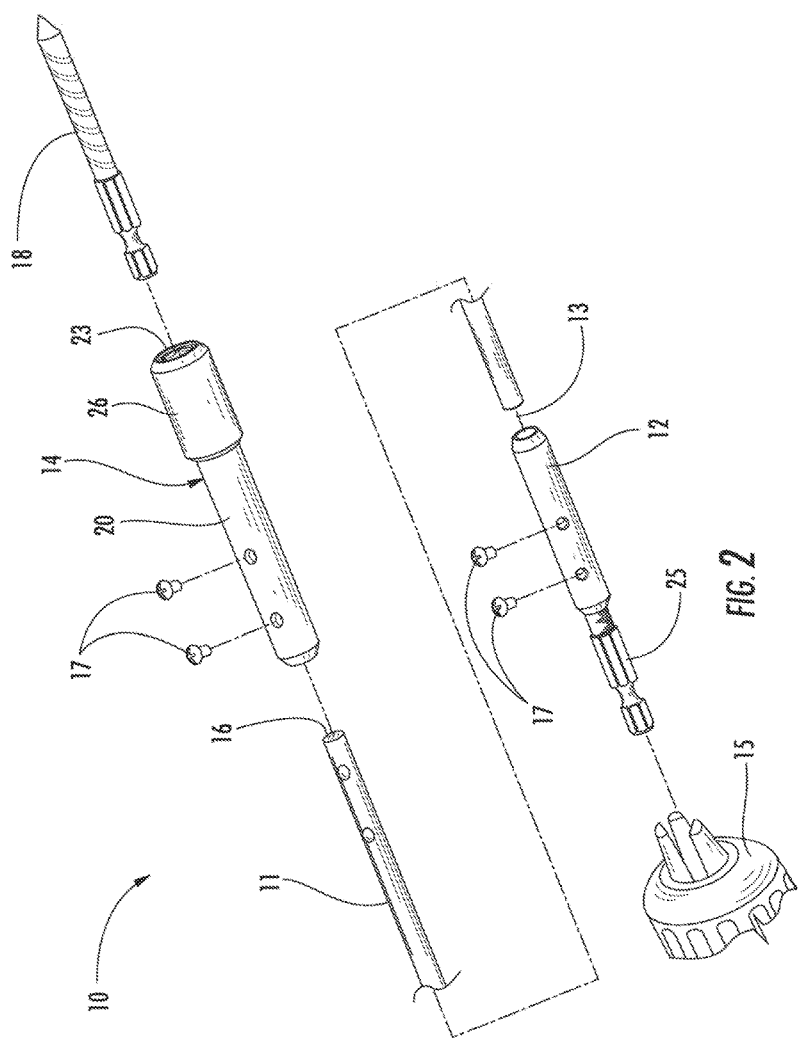
FIG. 2 is an exploded view of a drill bit assembly.

As shown in FIG. 2, the drill bit assembly 10 includes a flexible, solid-core extension rod 11 to withstand the forces of drilling, a tailpiece 12 secured to a first end 13 of the rod 11 and adapted to be received by a drill 15, and a quick-release head 14 secured to an opposing second end 16 of the rod 11. The tailpiece 12 includes a shank 25 with a hexagonal profile to prevent slipping within the drill 15. As illustrated, the first and second ends 13 and 16 are received by the tailpiece 12 and head 14, respectively, and secured by set screws 17. It should be appreciated that the rod 11 may be secured to the tailpiece 12 and head 14 by any suitable fastening means, such as adhesives or welding. Furthermore, the first end of the rod could have a hexagonal shape for being received by a chuck of a drill. A drill bit 18 is received by the head 14 and may be removed and replaced by another drill bit when the cutting edge is damaged.

Figure 3:
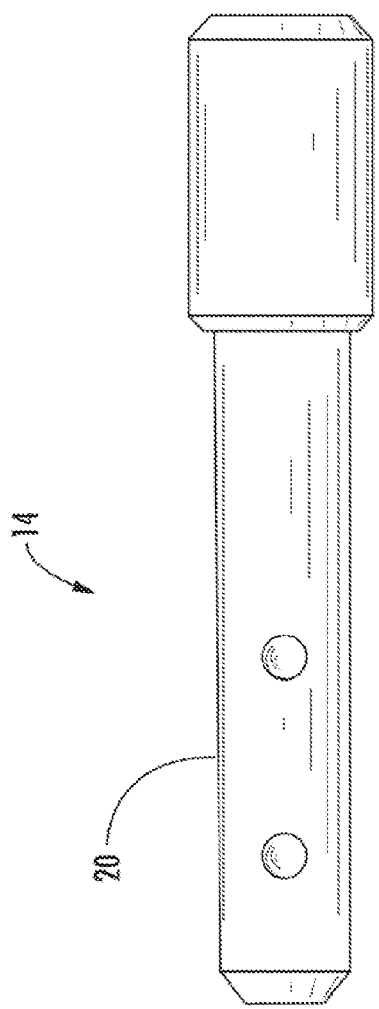
FIG. 3 is a side view of the quick-release head of the drill bit assembly of FIG. 2.
Figure 4:
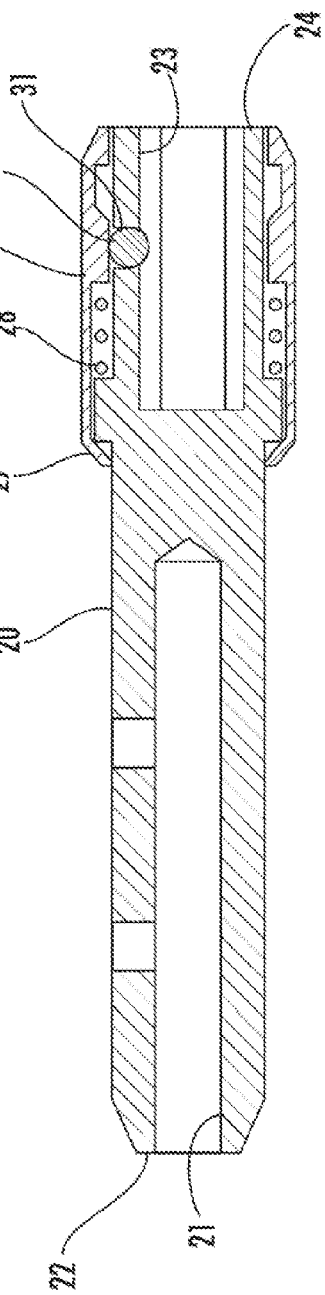
FIG. 4 is a cross-section of the quick-release head of FIG. 3.

Referring to FIGS. 3 and 4, the head 14 includes a body 20 having a first bore 21 positioned in a first end 22 for receiving the rod 11 and a second bore 23 positioned in an opposing second end 24 for receiving the drill bit 18. As illustrated, the second bore 23 has a hexagonal profile; however, any suitable profile may be used. A spun-over sleeve 26 is positioned over the second end 24 for releasing and securing the drill bit 18 within the second bore 23. The sleeve 24 includes a chamfered section 27 that abuts against the body 14 to retain the sleeve on the body 14 during use.

A spring 28 is contained between the sleeve 26 and the second end 24 to bias the sleeve 26 towards a securing position. A locking ball 30 is positioned in a recess 31 of the second end 24 for locking the drill bit 18 in the second bore 23. When in the securing position, the sleeve 26 presses the ball 30 inwardly into the second bore 23 to hold the drill bit 18 in position. To release the drill bit 18, the sleeve 26 is pulled back towards the first end 22, thereby compressing the spring 27 and allowing the ball 30 to move outwardly from the bore 23 and into a recess 32 defined by the sleeve 26.

Figure 5:
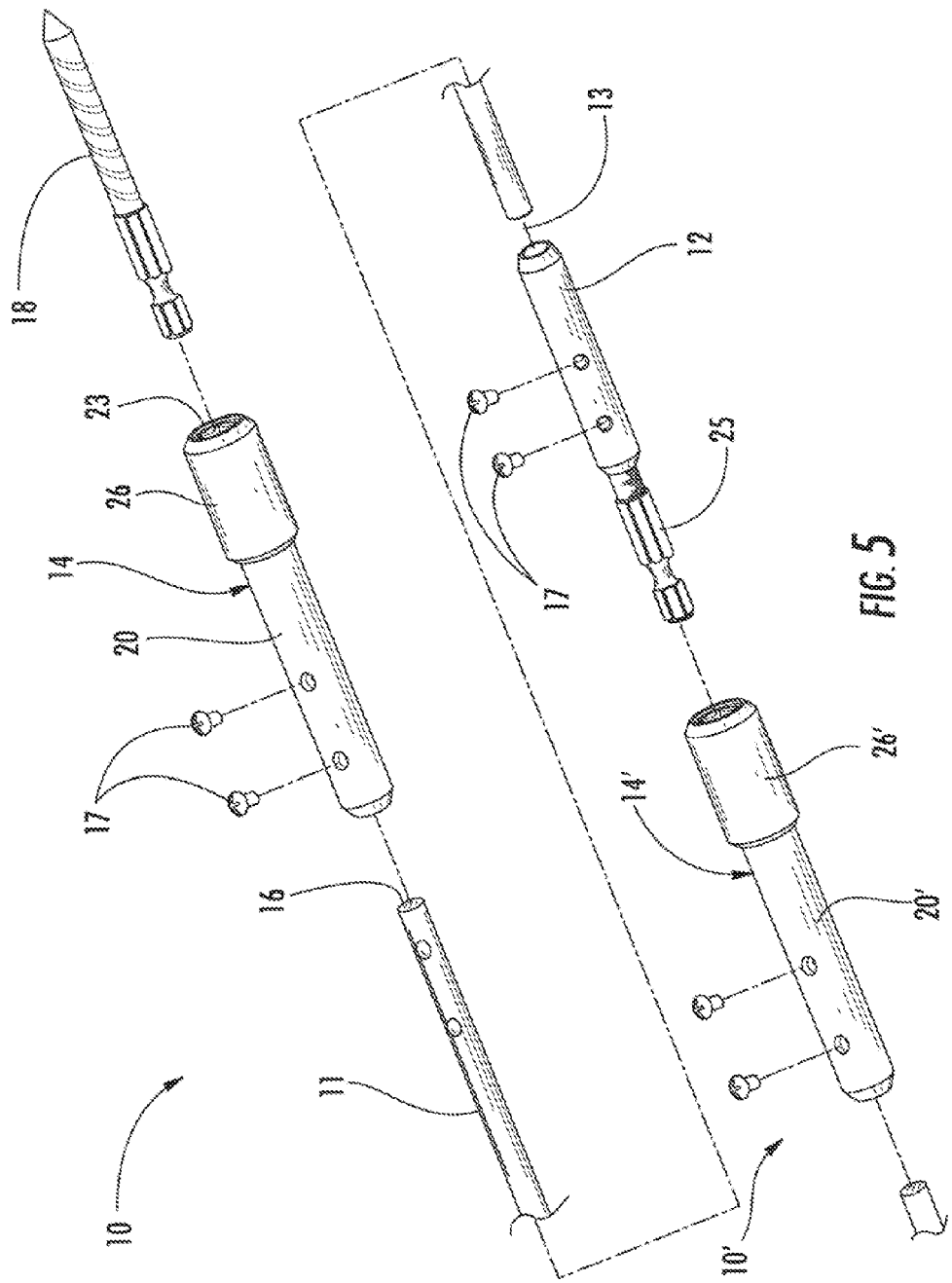
FIG. 5 shows two drill bit assemblies of FIG. 2 connected together.

As illustrated in FIG. 5, the drill bit assembly 10 may be connected to another drill bit assembly 10'. As illustrated, the shank 25 of the assembly 10 is inserted into a quick-release head 14' of the drill bit assembly 10'. By connecting multiple drill bit assemblies together, a user can extend the length of the drill bit for longer runs.

Figure 6:
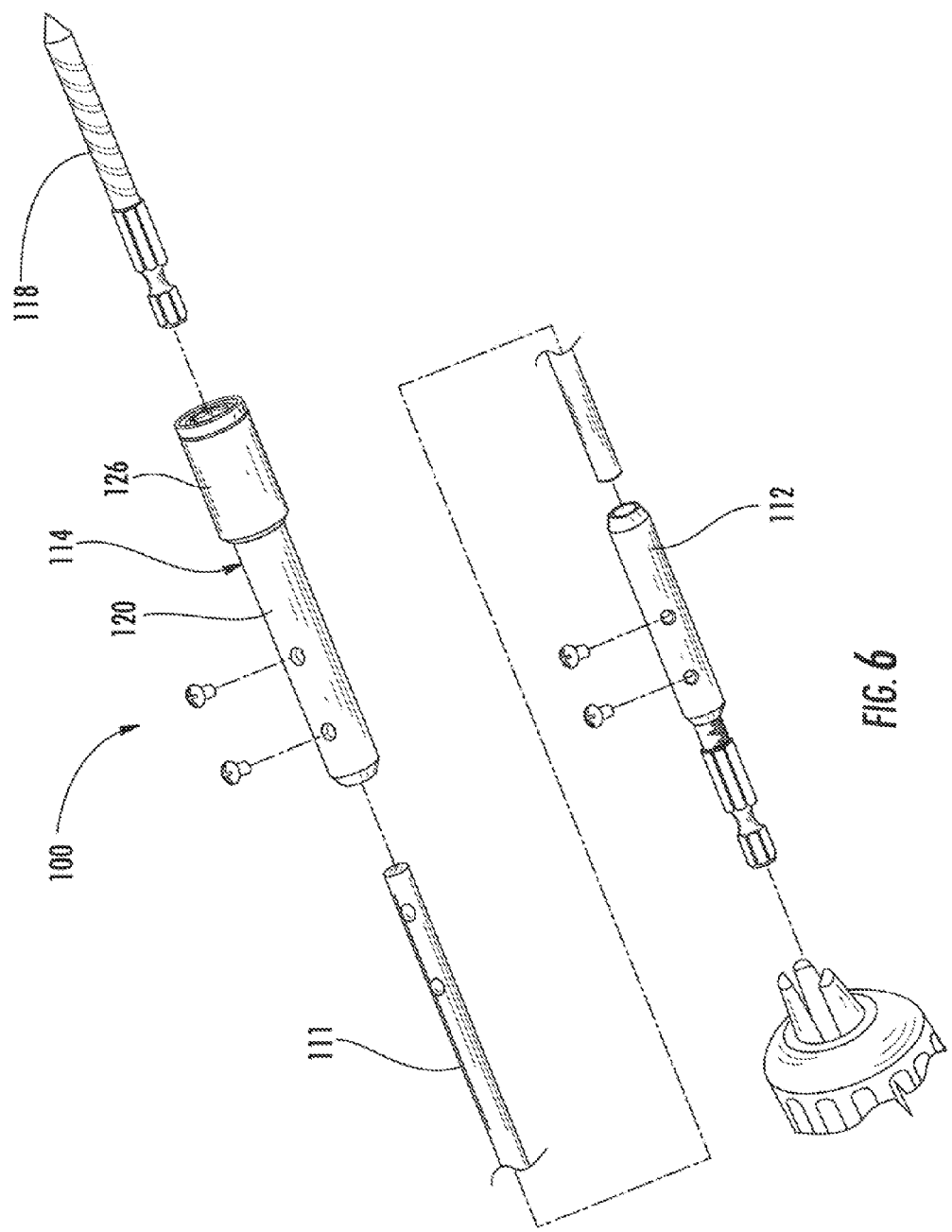
FIG. 6 is an exploded view of a drill bit assembly.

Referring to FIG. 6, a drill bit assembly is shown generally at reference numeral 100. Like drill bit assembly 10, drill bit assembly 100 includes a flexible, solid-core extension rod 111, a tailpiece 112, and a quick-release head 114.

Figure 7:
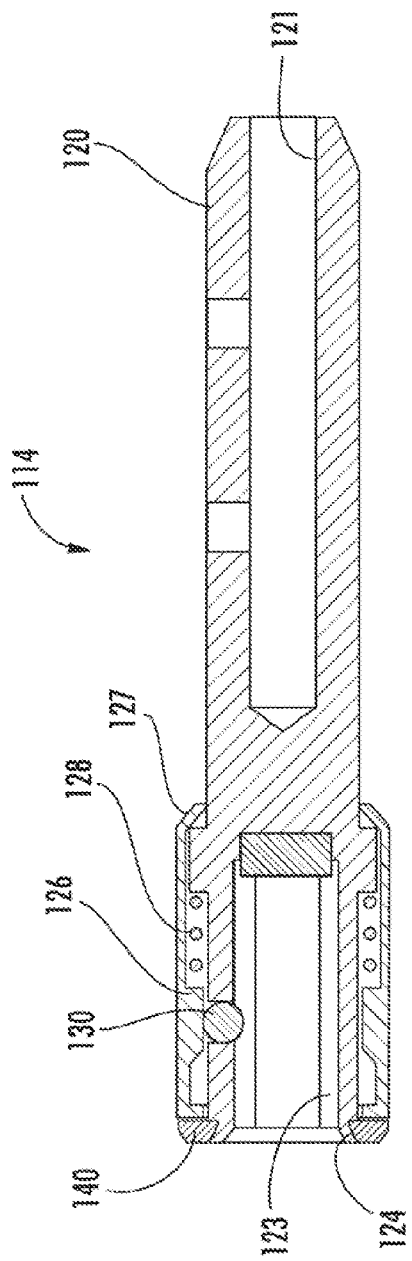
FIG. 7 is a cross-section of a quick-release head of the drill bit assembly of FIG. 6 in a secure, closed position.
Figure 8:
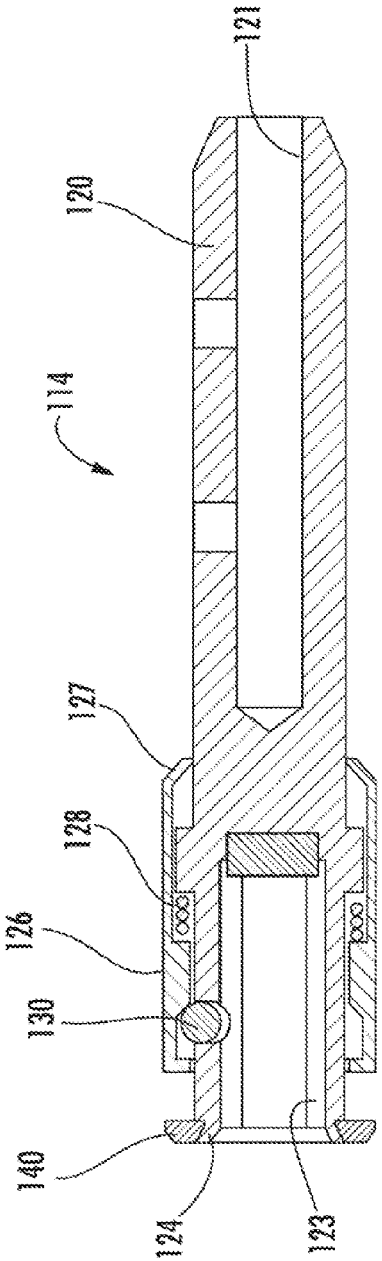
FIG. 8 is a cross-section of the quick-release head of FIG. 7 in an open, receiving position.
Figure 9:
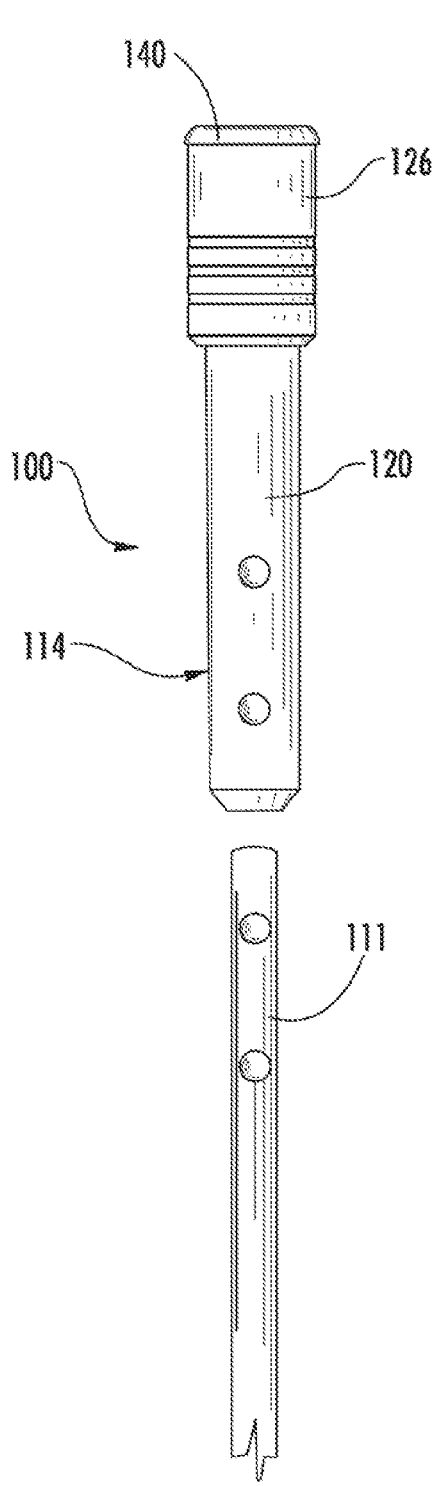
FIG. 9 shows the quick-release head of FIG. 7 in the secure, closed position.

As shown in FIGS. 7 and 8, like head 14, head 114 includes a spun-over sleeve 126 having a chamfer and a body 120 having a first bore 121 and a second bore 123. The head 114 also includes a spring 128 and a locking ball 130. Unlike the head 14, head 114 includes a shield 140 and a magnet 141. The shield 140 is attached to a second end 124 of the body 120 independent of the sleeve 126, FIGS. 8 and 10, and is adapted to prevent the sleeve 126 from being inadvertently pushed back towards a first end 122 of the body 120 by a stationary object, which would release a drill bit 118 secured in the second bore 123. As illustrated in FIG. 9, the shield 140 has a diameter slightly larger than a diameter of the sleeve 126. The shield 140 may be integrally formed with the body 120, secured by press-fitting the shield 140 onto the body 120, or any other means for securing the shield 140 to the body 120.

Figure 10:
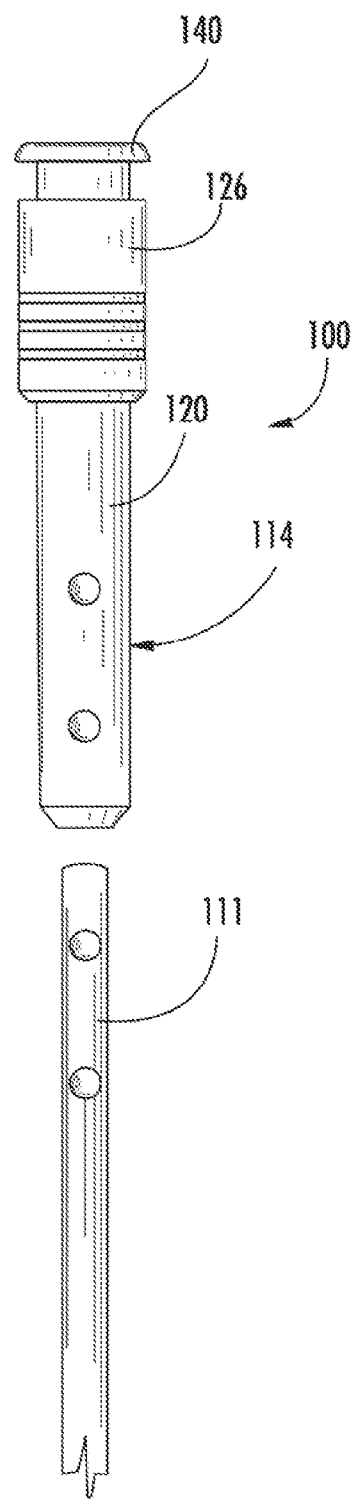
FIG. 10 shows the quick-release head of FIG. 7 in the open, receiving position.

As can be seen in FIGS. 9 and 10, the head 114 operates in substantially the same manner as the head 14.

Referring to FIGS. 11 and 12, a drill bit assembly is shown generally at reference numeral 200. Like drill bit assembly 10, drill bit assembly 200 includes a flexible, solid-core extension rod 211, a tailpiece 212 (not shown), and a quick-release head 214.

Figure 13:
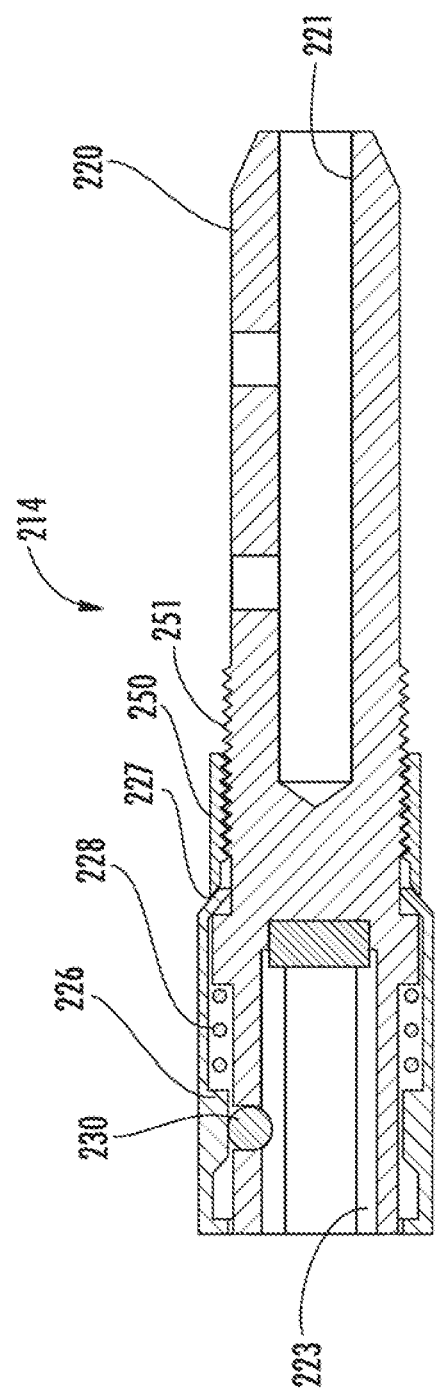
FIG. 13 is a cross-section of a quick-release head of the drill bit assembly of FIG. 11.

As shown in FIG. 13, like head 14, head 214 includes a sleeve 226 having a chamfer 227 and a body 220 having a first bore 221 and a second bore 223. The head 214 also includes a spring 228 and a locking ball 230. The head may also include a magnet like magnet 141 in FIGS. 7 and 8.

Referring again to FIGS. 11 and 12, unlike the head 14, head 214 includes a threaded nut/collar 250 in threaded engagement with threads 251 positioned along the body 220. The collar 250 is positioned behind the sleeve 226 to prevent the sleeve 226 from being inadvertently pushed back towards a first end 222 of the body 220 by a stationary object, which would release a drill bit secured in the second bore 223. As illustrated in FIG. 11, when the collar 250 is rotated into a release position, the sleeve 226 may be pushed back to allow a drill bit to be released. As shown in FIG. 12, when the collar 250 is in the secured position, the collar 250 is positioned tightly against the chamfer 227 of the sleeve 226, thereby preventing the release of a drill bit.

Figure 16:
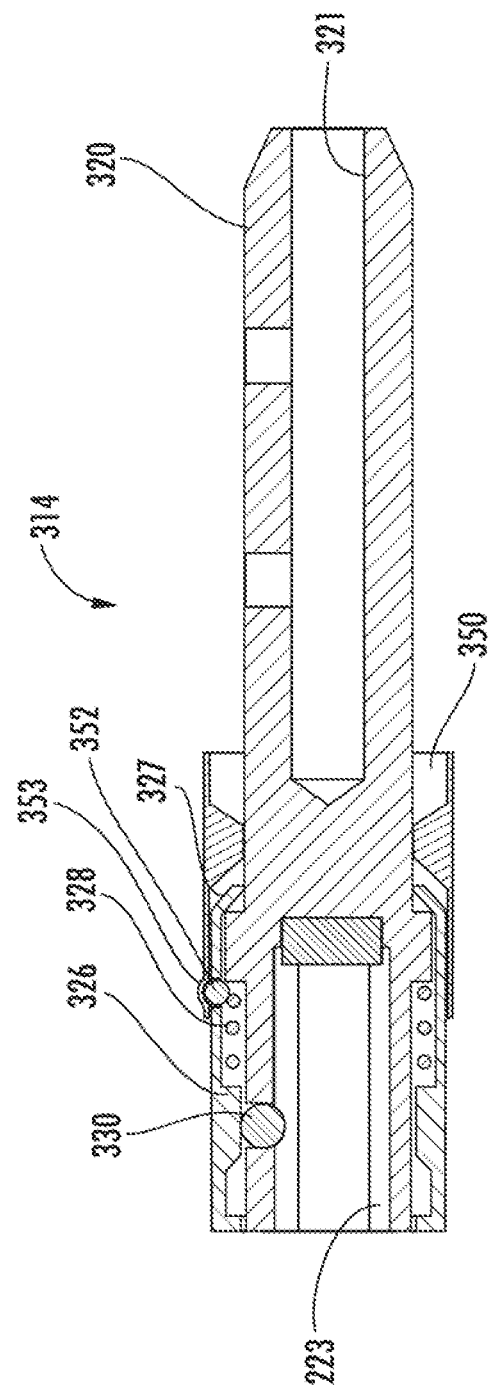
FIG. 16 is a cross-section of a quick-release head of the drill bit assembly of FIG. 14.

Referring to FIGS. 14 and 15, a drill bit assembly is shown generally at reference numeral 300. Like drill bit assembly 10, drill bit assembly 300 includes a flexible, solid-core extension rod 311, a tailpiece 312 (not shown), and a quick-release head 314. As shown in FIG. 16, head 314 includes a sleeve 326 having a chamfer 327 and a body 320 having a first bore 321 and a second bore 323. The head 314 also includes a spring 328 and a locking ball 330. Head 314 may also include a magnet like magnet 141 shown in FIGS. 7 and 8.

Unlike the head 14, head 314 includes a push button detent 352 positioned on sleeve 326 for interaction with nut/collar 350. The push button detent 352 may also be used to lock sleeve 326 in a secured position directly. The collar 350 is positioned behind the sleeve 326 and slidable along the body 320 from a released position, FIG. 14, to a secured position, FIG. 15, where a portion of the collar 350 is slid over the sleeve 326 such that the push button detent 352 engages a receiver 353 on the collar 352. When in the secured position, the collar 350 and detent 352 prevent the sleeve 326 from being inadvertently pushed back towards a first end 322 of the body 320 by a stationary object, which would release a drill bit secured in the second bore 323.

Figure 17:
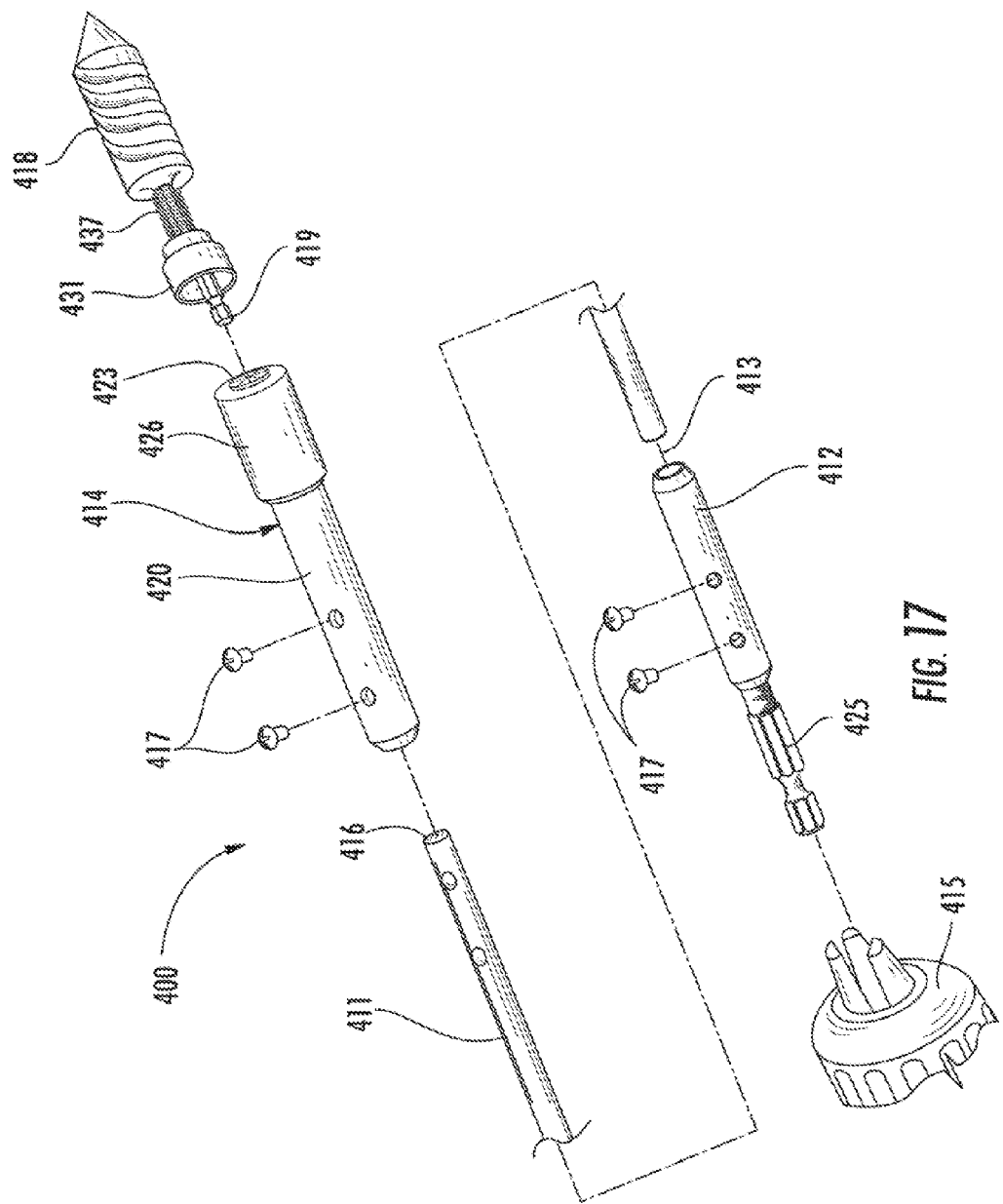
FIG. 17 is an exploded view of a drill bit assembly.

Referring to FIG. 17, a drill bit assembly is shown generally at reference numeral 400. Like drill bit assembly 10, drill bit assembly 400 includes a flexible, solid-core extension rod 411, a tailpiece 412 secured to a first end 413 of the rod 411 and adapted to be received by a drill 415, and a quick-release head 414 secured to an opposing second end 416 of the rod 411. The quick-release head 414 has the same characteristics as the head 14. The tailpiece 412 includes a shank 425 with a hexagonal profile to prevent slipping within the drill 415. As illustrated, the first and second ends 413 and 416 are received by the tailpiece 412 and head 414, respectively, and secured by set screws 417. It should be appreciated that the rod 411 may be secured to the tailpiece 412 and head 414 by any suitable fastening means, such as adhesives or welding. Furthermore, the first end of the rod 411 could have a hexagonal shape for being received by a chuck of a drill. As shown, a drill bit 418 is received by the head 414 and includes a shaft 419 having a hexagonal profile, a spring 437 positioned on the shaft 419, and a shield 431 biased towards the head 414 by the spring 437.

Figure 18:
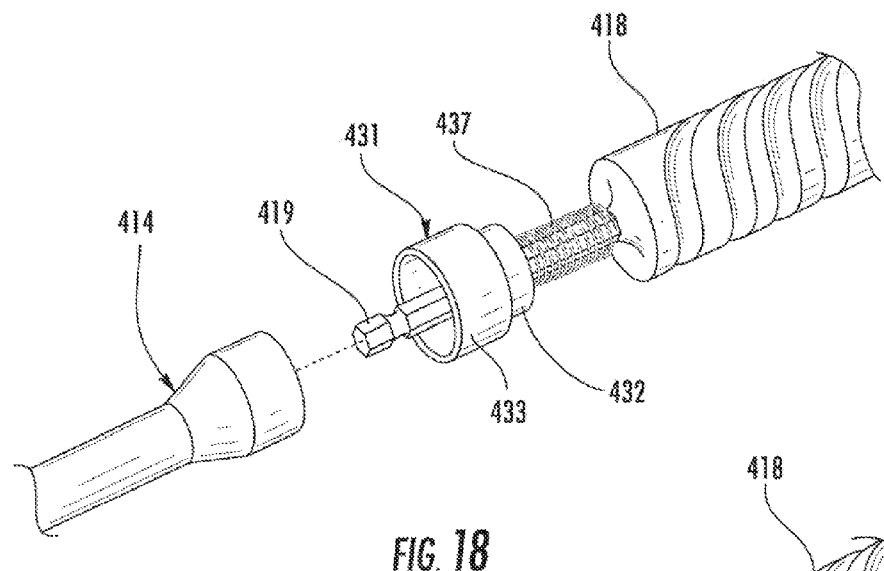
FIG. 18 shows a drill bit of the drill bit assembly of FIG. 17.
Figure 19:
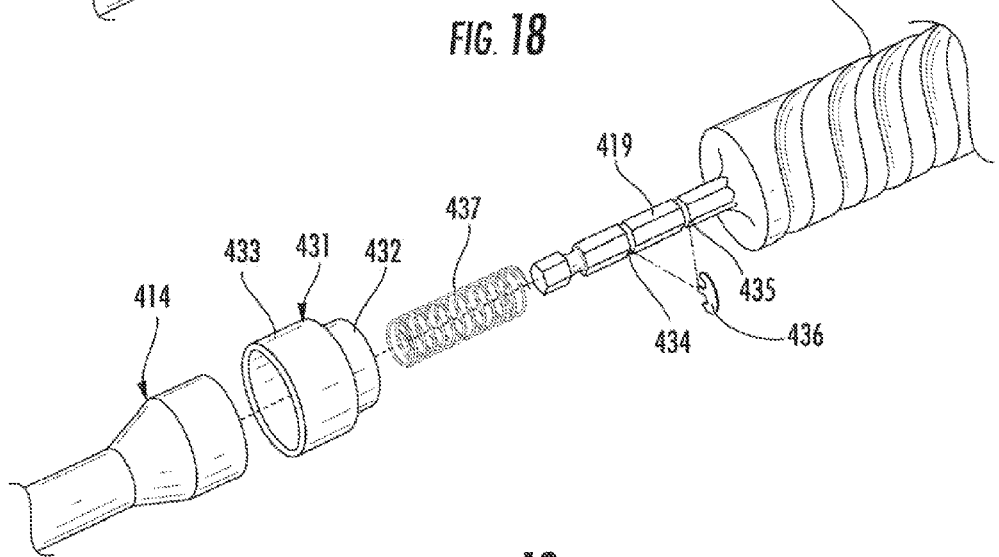
FIG. 19 shows an exploded view of the drill bit assembly of FIG. 18.

As illustrated in FIGS. 18 and 19, the spring 437 is positioned on the shaft such that the spring 437 rests between a cutting edge of the bit 418 and the shield 431 to allow the spring 437 to bias the shield 431 away from the cutting edge and towards the head 414. The shield 431 is positioned over the shaft 419 and has a first end 432 for engagement with the spring 437 and a second end 433 for covering the sleeve 426 of the head 414.

A pair of grooves or holes 434 and 435 are formed in the shaft 419 to allow a retainer 436, such as a pin or clip or any other suitable retainer, to provide a stop for the shield 431. Groove 434 is positioned along the shaft 419 such that the retainer 436 may be used to prevent the shield 431 from being pushed off of the shaft 419 by the spring 437. This would be the configuration used in FIG. 18. Groove 435 would be used in the case where the spring 437 is eliminated and only the shield is used on the shaft 419. In this configuration, the retainer 434 would be installed in the groove 435 such that the retainer 436 prevents the shield 431 from moving along the shaft 419 towards the cutting edge of the bit 418, thereby preventing the shield 431 from disengaging the head 414 when the bit 418 is connected to the head 414.

Figure 20:
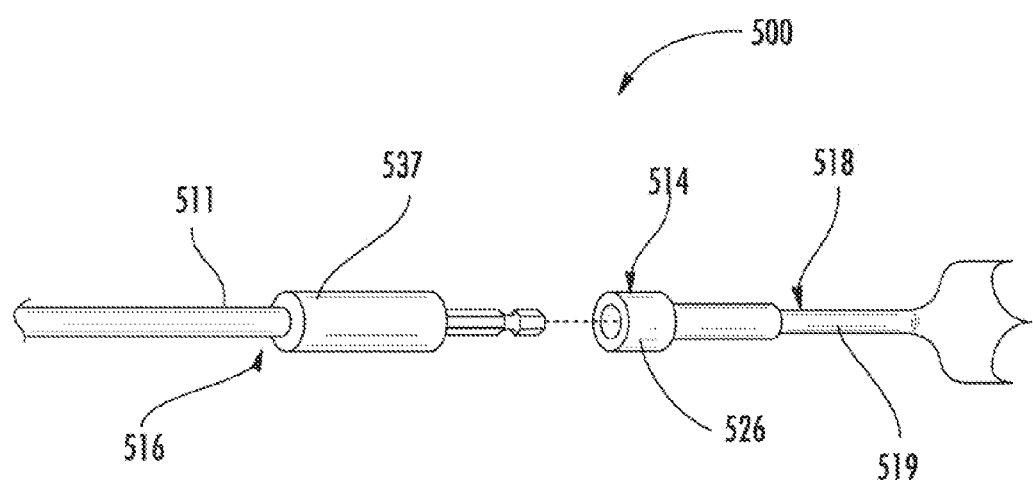
FIG. 20 shows a drill bit assembly.

Referring to FIG. 20, a drill bit assembly is shown generally at reference numeral 500. Like drill bit assembly 10, drill bit assembly 500 includes a flexible, solid-core extension rod 511 and a tailpiece 512 secured to a first end 513 of the rod 511 (not shown). Unlike drill bit assembly 10, drill bit assembly 500 includes a second tailpiece 537 positioned on the second end 516 of the rod 511 for connection to drill bit 518.

As shown, drill bit 518 includes a quick-release head 514 having the same characteristics as head 14 positioned on a shaft 519 of the drill bit 518. By placing the quick-release head 514 on the shaft 519 of the drill bit 518, the sleeve 526 of the head 514 cannot be disengaged when drilling a hole, thereby preventing the drill bit 518 from disengaging the tailpiece 537.

A flexible and extendible drill bit assembly is described above. Various details of the invention may be changed without departing from its scope. Furthermore, the foregoing description of the preferred embodiments of the invention and best mode for practicing the invention are provided for the purpose of illustration only and not for the purpose of limitation.

What is claimed is:

1. An extension assembly configured to permit a user to drill a hole through inaccessible areas in a wall, comprising:
    (a) a flexible, solid core rod having first and second ends, the rod being configured to extend through a hole in a wall cavity and flex therein to position a tool bit at an inaccessible location in the wall cavity and permit a user to drill a hole through a substrate at the inaccessible location;
    (b) a holding means secured to the second end of the rod for releasably holding a tool bit for rotation with the rod, the holding means including a sleeve adapted to slide axially along a body of the holding means between a secured position where a tool bit is securely held within the holding means and a release position where the tool bit is released from the holding means; and
    (c) a ball-detent adapted to lock the sleeve in the secured position.

2. The extension assembly according to claim 1, and further including a tailpiece secured to the first end of the rod, wherein the tailpiece is adapted to prevent slipping of the extension assembly within a chuck of a drill.

3. The extension assembly according to claim 1, wherein the holding means includes a bore for receiving a tool bit therein and a locking mechanism cooperating with the bore to secure the tool bit therein.

4. The extension assembly according to claim 3, wherein the sleeve is operably connected to the locking mechanism such that when the sleeve is in the release position the locking mechanism allows the insertion or removal of a tool bit in the bore and when the sleeve is in the secured position the locking mechanism prevents the insertion or removal of the tool bit in the bore.

5. The extension assembly according to claim 1, wherein the first end of the rod has a hexagonal profile for being received by the chuck of a drill, the first end being adapted to prevent slipping of the extension assembly within the chuck during use.

6. A drill bit assembly configured to permit a user to drill a hole through inaccessible substrates in a wall, consisting essentially of:
    (a) a flexible, solid core rod having first and second ends;
    (b) a quick-release head secured to the second end of the rod for receiving and securing a drill bit therein, the head including a sleeve adapted to slide axially along a body of the head between a secured position where a drill bit is securely held within the head and a release position where the drill bit is released from the head; and
    (c) a collar positioned around the body and configured to engage the sleeve and prevent the sleeve from moving from the secured position to the release position.

7. The drill bit assembly according to claim 6, wherein the body includes a first bore for receiving the second end of the rod and a second bore with an open end for receiving the drill bit therein.

8. The drill bit assembly according to claim 7, and further including an outwardly-extending shield disposed around the open end of the second bore and adapted to prevent unintended contact against an axially-facing surface of the sleeve.

9. The drill bit assembly according to claim 6, wherein the sleeve is a forward biased sleeve positioned around the body adjacent to the second bore.

10. The drill bit assembly according to claim 6, wherein the sleeve is retained axially along the body by a reduced-diameter chamfer disposed in abutting contact with a shoulder portion of the body.

11. The drill bit assembly according to claim 6, wherein the collar is adapted for movement along the body between a secured position where the collar engages the sleeve and an unsecured position where the sleeve is allowed to move to the release position.

12. The drill bit assembly according to claim 11, wherein the collar is in threaded engagement with the body such that rotation of the collar causes the collar to move axially along the body between the secured and unsecured positions.

13. The drill bit assembly according to claim 11, wherein the collar is slidably connected to the body to allow the collar to move axially along the body between the secured and unsecured positions.

14. The drill bit assembly according to claim 6, wherein the sleeve includes a ball-detent adapted to lock the sleeve in the secured position.

15. The drill bit assembly according to claim 14, wherein the collar includes a receiver adapted to receive the ball-detent therein and force the ball-detent into a locked position such that the sleeve and collar are locked in the secured position.

16. The drill bit assembly according to claim 6, wherein the drill bit includes a shield positioned around a shaft of the drill bit.

17. The drill bit assembly according to claim 16, wherein the shield is adapted to cover the sleeve of the head and prevent the sleeve from being inadvertently moved from the secured position to the release position.

18. The drill bit assembly according to claim 6, wherein the drill bit includes a biasing means and shield positioned around a shaft of the drill bit, the biasing means being adapted to bias the shield away from a cutting edge of the drill bit.

* * * * *